(12) United States Patent
Gundacker et al.

(10) Patent No.: US 7,143,217 B2
(45) Date of Patent: Nov. 28, 2006

(54) DEVICE CONFIGURATION

(75) Inventors: Ralph Gundacker, Talheim/Neckar (DE); Brian J. Skerry, Gilbert, AZ (US); James D. Warren, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 10/157,386

(22) Filed: May 28, 2002

(65) Prior Publication Data

US 2003/0225941 A1  Dec. 4, 2003

(51) Int. Cl.
*G06F 13/00* (2006.01)
*G06F 3/00* (2006.01)

(52) U.S. Cl. .................. 710/107; 710/2; 710/15; 710/36; 710/58; 710/300

(58) Field of Classification Search .............. 710/8, 710/10, 12, 15, 16, 17, 58, 107, 300, 36
See application file for complete search history.

(56) References Cited

U.S. PATENT DOCUMENTS

| | | | |
|---|---|---|---|
| 4,509,113 A | 4/1985 | Heath | |
| 5,790,895 A | 8/1998 | Krontz et al. | |
| 5,835,752 A * | 11/1998 | Chiang et al. | 713/400 |
| 5,911,055 A | 6/1999 | Whiteman et al. | |
| 5,948,076 A | 9/1999 | Anubolu et al. | |
| 6,061,746 A | 5/2000 | Stanley et al. | |
| 6,065,081 A | 5/2000 | Stancil et al. | |
| 6,070,207 A | 5/2000 | Bell | |
| 6,085,333 A | 7/2000 | DeKoning et al. | |
| 6,098,119 A | 8/2000 | Surugucchi et al. | |
| 6,148,356 A | 11/2000 | Archer et al. | |
| 6,260,094 B1 | 7/2001 | Davis et al. | |
| 6,295,565 B1 | 9/2001 | Lee | |
| 6,425,079 B1 | 7/2002 | Mahmoud | |
| 6,446,139 B1 | 9/2002 | Leung et al. | |

FOREIGN PATENT DOCUMENTS

EP  0 772 134 A1  5/1997

OTHER PUBLICATIONS

Internet Product Section—OEM Soloutin, printed Mar. 4, 2004, 3 pages.
I/O Processors—Product Brief, Intel IOP303 I/O Processor Boosts Interland Bus and PCY Bandwidth, printed Mar. 4, 2004, 5 pages.
Adaptec Article: Zero Channel RAID Frequently ASked Questions, printed Mar. 4, 2004, 6 pages.
Adaptec Article: Motherboard Partners and Compatibility, printed Mar. 4, 2004, 2 pages.

(Continued)

*Primary Examiner*—Kim Huynh
*Assistant Examiner*—Alan S Chen
(74) *Attorney, Agent, or Firm*—Blakely, Sokoloff, Taylor & Zafman LLP (57) ABSTRACT

In one embodiment, a method is provided. The method of this embodiment may include receiving an indication that a first device has been granted access to a bus. In response, at least in part, to the indication, a signal may be provided that may result in the coupling of a signal line of a second device to the bus. After the provision of the signal, the first device may configure the second device. Of course, many modifications, variations, and alternatives are possible without departing from this embodiment.

22 Claims, 5 Drawing Sheets

OTHER PUBLICATIONS

Adaptec SCSI RAID 2005S Technical Specification, printed Mar. 4, 2004, 3 pages.
Adaptec SCSI RAID 2000S Support, printed Mar. 4, 2004, 1 page.
Adaptec SCSI RAID 2005S Support, printed Mar. 4, 2004, 1 page.
Intel RAID Controller SRCMR, Product Specifications, printed Mar. 4, 2004, 3 pages.
PCI Local Bus, PCI-to-PCI Bridge Architecture Specification, Revision 1.1, Dec. 18, 1998.
PCI Local Bus, PCI Bus Power Management Interface Specification, Revision 1.1, Dec. 18, 1998.
PCI Local Bus, PCI BIOS Specification, Revision 2.1, Aug. 26, 1994.
PCI Local Bus, PCI Local Bus Specification, Revision 2.2, Dec. 18, 1998.
PCI Local Bus, Mini PCI Specification, Revision 1.0, Oct. 25, 1999.
Super P3TDDR, User's Manual, Revision 1.0a, 2002.
PCI Local Bus, PCI-X Addendum to the PCI Local Bus Specification, Revision 1.0a, Jul. 24, 2000.
Intel Server Board SCB2, Powerful, Rack-Optimized Derver Board for Reliable High-Density Solutions, Product Brief.
Intel, 21555 Non-Transparent PCT-toPCI Bridge, User Manual, Jul. 2001.
R. Russel, BIOS Basics Online!, Jun. 5, 2001, one page.
A. Tischenko, "Zero-Channel RAID. The Economic Approach", Computer Review Online!, four pages.
Intel Corporation, "DK440LX Motherboard—Technical Product Specification", Oct. 1997, 106 pages.
Intel Corporation, "MROMB Design Considerations Using the Intel 80303 I/O Processor—Application Note" Sep. 2001, 15 pages.
Copy of PCT Written Opinion dated Apr. 19, 2004.

* cited by examiner

DEVICE CONFIGURATION

CROSS-REFERENCE TO RELATED APPLICATIONS

The subject application is related to the following applications:

U.S. patent application Ser. No. 09/472,502 filed Dec. 27, 1999, entitled "Controlling I/O Devices Independently Of A Host Processor," now issued as U.S. Pat. No. 6,502,156;

U.S. patent application Ser. No. 09/474,752 filed Dec. 29, 1999, entitled "Device And Method To Enable Interrupt Handling And Control For Mass Storage Devices Interfacing To Different Controllers," now issued as U.S. Pat. No. 6,574,680;

U.S. patent application Ser. No. 10/112,789 filed Mar. 28, 2002, entitled "Device Discovery And Dynamic Configuration Of Control Application";

U.S. patent application Ser. No. 10/140,631 filed May 7, 2002, entitled "Device Control And Configuration";

U.S. patent application Ser. No. 10/158,094 filed May 29, 2002, entitled "Device Resource Allocation";

U.S. patent application Ser. No. 10/090,944 filed Mar. 4, 2002, entitled "Control Procedure Selection";

U.S. patent application Ser. No. 10/113,458 filed Mar. 28, 2002, entitled "Device Resource Allocation";

Each of these related U.S. patent applications is assigned to the Assignee of the subject application.

FIELD

This disclosure relates to the field of device configuration.

BACKGROUND

In a modular redundant array of independent or inexpensive disk (RAID) on motherboard (MROMB) system, MROMB circuitry residing on a circuit card, for example, may be used to configure and/or control, independently of a host processor residing on a motherboard, an input/output (I/O) controller that also may reside on the motherboard. MROMB hardware on the motherboard may perform operations that may enable the MROMB circuitry on the circuit card to configure and/or control the I/O controller independently of the host processor.

The host processor also may perform operations that may enable the host processor to configure one or more devices in the system. However, if both the host processor and the circuit card's MROMB circuitry attempt to configure the I/O controller, the performance of the I/O controller and/or the system may be adversely affected. For example, if both the host processor and the circuit card's MROMB circuitry contemporaneously attempt to configure the I/O controller, this may result in contention between the host processor and the circuit card's MROMB circuitry that may halt of the system's operation.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

It should be understood that although the following Detailed Description will proceed with reference being made to illustrative embodiments, many alternatives, modifications, and variations thereof will be apparent to those skilled in the art.

DETAILED DESCRIPTION

Figure 1:
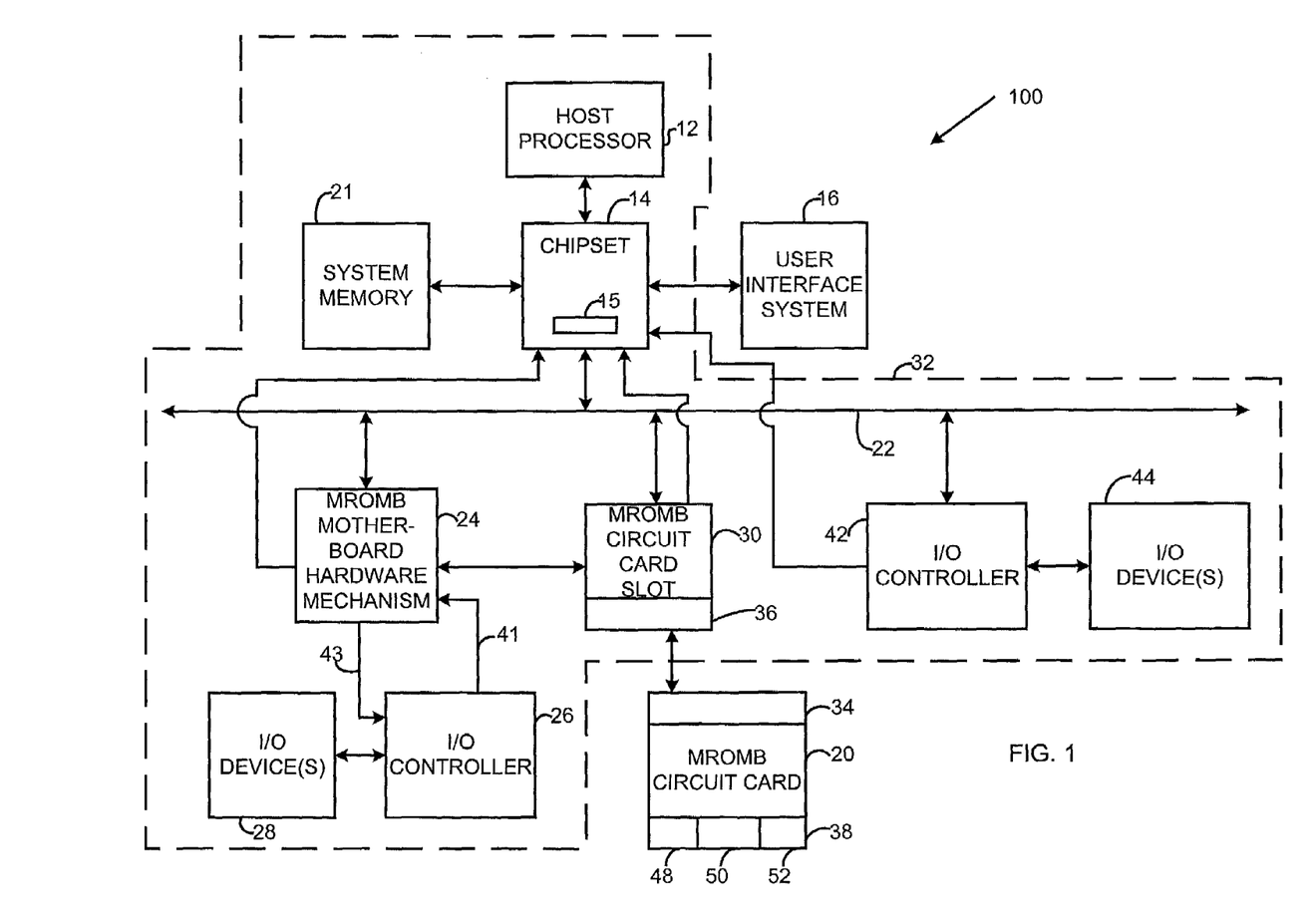
FIG. 1 is a diagram that illustrates an embodiment of claimed subject matter.

FIG. 1 illustrates a system embodiment 100. System 100 may include a host processor 12 coupled to a chipset 14. Host processor 12 may comprise, for example, an Intel® Pentium® III or IV microprocessor that is commercially available from the assignee of the subject application. Of course, alternatively, host processor 12 may comprise another type of microprocessor, such as, for example, a microprocessor that is manufactured and/or commercially available from a source other than the assignee of the subject application, without departing from this embodiment.

Chipset 14 may comprise a host bridge/hub system that may couple host processor 12, a system memory 21 and a user interface system 16 to each other and to a bus system 22. Chipset 14 may also include an I/O bridge/hub system (not shown) that may couple the host bridge/bus system to bus 22. Chipset 14 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. Additionally, chipset 14 may include an interrupt controller 15 that may process interrupts that it may receive from other components in system 100, such as, for example, MROMB circuit card 20, when card 20 is properly inserted into circuit card bus extension slot 30, I/O controller 26, and I/O controller 42. Of course, alternatively, the operative MROMB circuitry described herein as being comprised in card 20, need not be comprised in card 20, but instead, without departing from this embodiment, may be comprised in other structures, systems, and/or devices that may be coupled to bus 22, and exchange data and/or commands with other components in system 100. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, if system 100 is appropriately modified, bus 22 instead may comprise a bus that complies with the PCI-X Specification Rev. 1.0a, published by and available from the aforesaid PCI Special Interest Group, Portland, Oreg., U.S.A. (hereinafter referred to as a "PCI-X bus"). It should be appreciated, however, that if system 100 is appropriately modified, bus 22 may comprise other types and configurations of bus systems, without departing from this embodiment.

An I/O controller 26 may be coupled, via MROMB motherboard hardware mechanism 24, to chipset 14, PCI bus 22, and MROMB circuit card slot 30. I/O controller 26 may also be coupled to and control the operation of one or more I/O devices (hereinafter collectively or singly referred to as "I/O device 28"). I/O device 28 may comprise, for example, a set of one or more storage devices comprising, e.g., one or more magnetic disks, optical disks, or solid-state storage devices. The one or more storage devices may be comprise, e.g., one or more arrays of mass storage devices.

Alternatively, I/O device 28, instead, may comprise one or more network adapter or interface devices that may be used to interface system 100 to one or more external computer networks. According to this alternative arrangement, I/O device 28 may exchange data and/or commands with external network devices (e.g., host or server computer nodes) via the one or more external computer networks.

System 100 also may include another I/O controller 42. I/O controller 42 may be coupled to bus 22. I/O controller 42 may also be coupled to and control the operation of one or more I/O devices (hereinafter collectively or singly referred to as "I/O device 44"). I/O device 44 may comprise, for example, a set of one or more storage devices comprising, e.g., one or more magnetic disks, optical disks, or solid-state storage devices. These one or more storage devices may be configured as e.g., one or more arrays of mass storage devices.

Alternatively, I/O device 44, instead, may comprise one or more network adapter or interface devices that may be used to interface system 100 to one or more external computer networks. According to this alternative arrangement, I/O device 44 may exchange data and/or commands with external network devices (e.g., host or server computer nodes) via the one or more external computer networks.

Processor 12, system memory 21, chipset 14, PCI bus 22, MROMB hardware mechanism 24, MROMB circuit card slot 30, I/O controller 26, and I/O controller 42 may be comprised in a single circuit board, such as, for example, a system motherboard 32. Although I/O device 28 and I/O device 44 are shown in FIG. 1 as being comprised in motherboard 32, I/O device 28 and/or I/O device 44 need not be comprised in the motherboard 32. For example, I/O device 28 and/or I/O device 44 each may be comprised in one or more enclosures that may be separate from the enclosure in which motherboard 32 and the components comprised in motherboard 32 may be enclosed.

Depending upon the particular configuration and/or operational characteristics of I/O device 28, I/O controller 26 may exchange data and/or commands with I/O device 28 using any one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, I/O controller 26 may exchange data and/or commands with I/O device 28 using other communication protocols, without departing from this embodiment of the claimed subject matter.

In accordance with this embodiment, a SCSI protocol that may be used by controller 26 to exchange data and/or commands with I/O device 28 may comply or be compatible with the interface/protocol described in American National Standards Institute (ANSI) Small Computer Systems Interface-2 (SCSI-2) ANSI X3.131-1994 Specification. If a FC protocol is used by controller 26 to exchange data and/or commands with I/O device 28, it may comply or be compatible with the interface/protocol described in ANSI Standard Fibre Channel (FC) Physical and Signaling Interface-3 X3.303:1998 Specification. Alternatively, if an Ethernet protocol is used by controller 26 to exchange data and/or commands with I/O device 28, it may comply or be compatible with the protocol described in Institute of Electrical and Electronics Engineers, Inc. (IEEE) Std. 802.3, 2000 Edition, published on Oct. 20, 2000. Further, alternatively, if a S-ATA protocol is used by controller 26 to exchange data and/or commands with I/O device 28, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by controller 26 to exchange data and/or commands with I/O device 28, it may comply or be compatible with the protocols described in Internet Engineering Task Force (IETF) Request For Comments (RFC) 791 and 793, published September 1981. Also in accordance with this embodiment, if I/O device 28 is used to interface system 100 to one or more external computer networks, I/O device 28 may exchange data and/or commands with external host and/or server computer nodes via the one or more external computer networks using, e.g., the aforesaid TCP/IP and/or Ethernet protocols.

Similarly, depending upon the particular configuration and operational characteristics of I/O device 44, I/O controller 42 may exchange data and/or commands with I/O device 44 using one of the different types of communication protocols that may be used by I/O controller 26 (depending upon the particular configuration and operational characteristics of I/O device 28) to exchange data and/or commands with I/O device 28. Alternatively, I/O controller 42 may exchange data and/or commands with I/O device 44 using other communication protocols, without departing from this embodiment of the claimed subject matter.

Circuit card slot 30 may comprise a PCI expansion slot that comprises a PCI bus connector 36. Connector 36 may be electrically and mechanically mated with a PCI bus connector 34 that is comprised in MROMB circuit card 20. In addition to comprising connector 34, circuit card 20 also may comprise MROMB circuitry 48. Circuitry 48 may comprise an I/O processor 50, computer-readable memory 48, and circuitry 52. Depending upon the particular embodiment, memory 48 may comprise one or more of the following types of computer-readable memories: semiconductor firmware memory, programmable memory, non-volatile memory, read only memory, electrically programmable memory, random access memory, cache memory, flash memory, magnetic disk memory, and/or optical disk memory. Additionally, it should be appreciated that, either additionally or alternatively, memory 48 may comprise other and/or later-developed types of computer-readable memory. Processor 50 may include integrated circuit chips (not shown) comprised in an integrated circuit chipset, such as those commercially available from the assignee of the subject application (e.g., the Intel® 80310 Chipset). Alternatively, processor 50 instead may comprise other integrated circuit chips (e.g., the Intel® 80960 RM/RN I/O processor, the Intel® 80321 processor, and/or other types of processors that are available from sources other than the assignee of the subject application), or other types of processors/integrated circuits without departing from this embodiment of the claimed subject matter.

Slot 30 and card 20 are constructed to permit card 20 to be inserted into slot 30. When card 20 is properly inserted into slot 30, connectors 34 and 36 become electrically and mechanically coupled to each other. When connectors 34 and 36 are so coupled to each other, card 20 becomes electrically coupled, via motherboard MROMB hardware mechanism 24, to controller 26 and to interrupt controller 15, and card 20 also becomes electrically coupled to bus 22.

In this embodiment, MROMB hardware mechanism 24 in motherboard 32 permits a MROMB technique to be implemented in system 100. For example, hardware mechanism 24 may comprise MROMB circuitry of the type used in the Intel® SCB2 Server Board (commercially available from the Assignee of the subject application), which MROMB circuitry may permit a RAID input/output steering (RAID-IOS) technique to be implemented in system 100. Alternatively, hardware mechanism 24 may comprise embedded RAID logic (EMRL) MROMB circuitry of the type used in, e.g., the P3TDDR™ motherboard (commercially available from SUPERMICRO Computer Corporation of San Jose, Calif., United States of America), which MROMB circuitry may permit an EMRL technique to be implemented in system 100. Although hardware 24 will be described herein as implementing either a RAIDIOS or an EMRL technique, alternatively, hardware mechanism 24 may implement other types of MROMB techniques, without departing from this embodiment.

Figure 2:
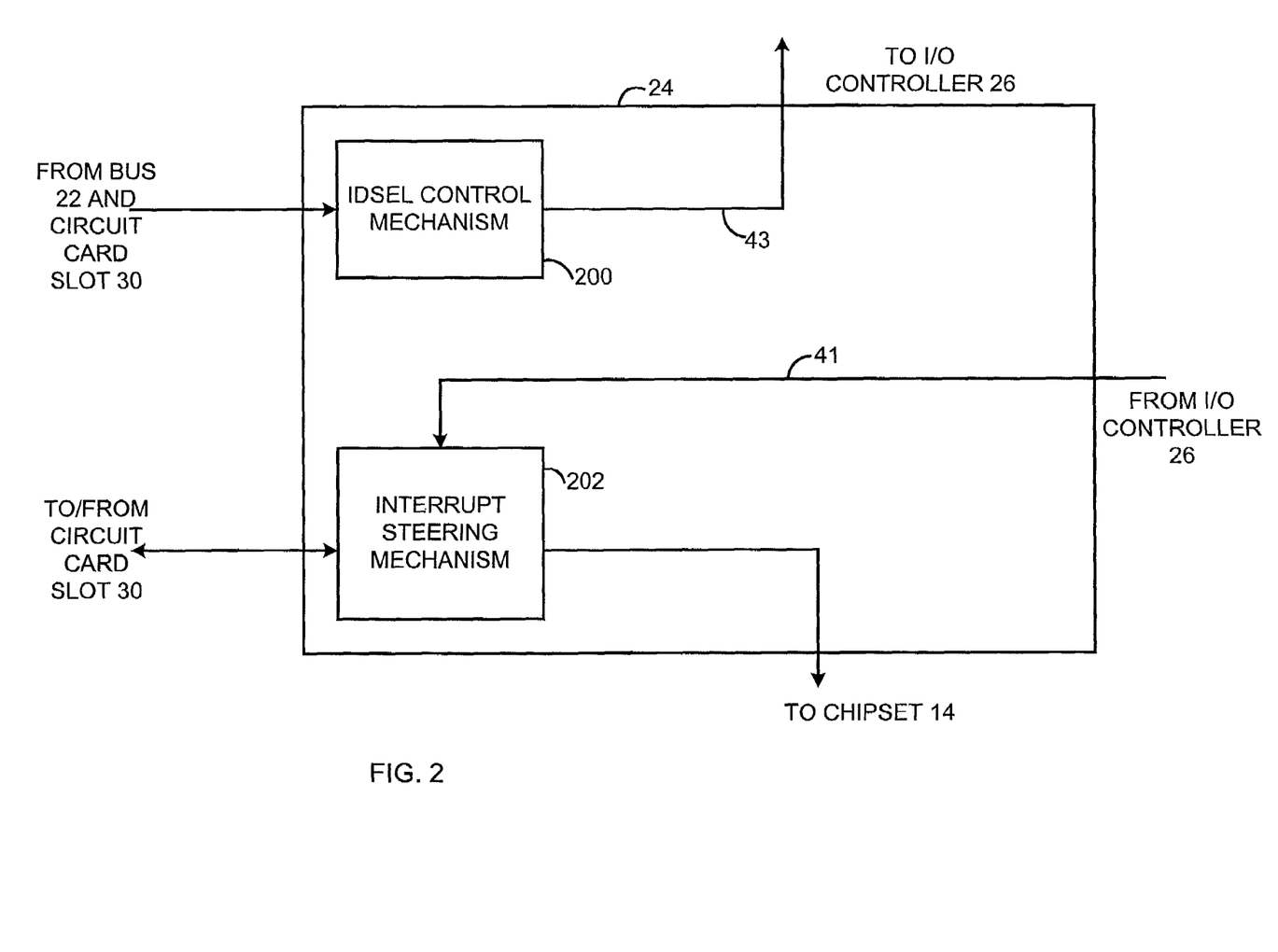
FIG. 2 is a diagram of MROMB motherboard hardware that may be comprised in the embodiment of FIG. 1.

With particular reference now being made to FIG. 2, the particular configuration and operation of hardware mechanism 24 may vary depending upon whether hardware mechanism 24 implements a RAIDIOS or non-RAIDIOS type of MROMB technique (e.g., the EMRL MROMB technique). However, in either case, in this embodiment, the MROMB hardware 24 may comprise an Initialization Device Select (IDSEL) control mechanism 200 and an interrupt steering mechanism 202. IDSEL control mechanism 200 may be coupled to PCI bus 22, circuit card slot 30, and I/O controller 26. IDSEL control mechanism 200 may include circuitry that may controllably couple an IDSEL signal line 43 of I/O controller 26 to, or de-couple line 43 from PCI bus 22, based at least in part upon a control signal provided from slot 30 to mechanism 200.

As is well known to those skilled in the art, IDSEL signal line 43 of I/O controller 26 may be coupled via MROMB hardware 24 to a predetermined one of the address lines of bus 22, and when line 43 is coupled to that predetermined address line, the IDSEL signal that may be supplied to controller 26 via that line 43 may be used during configuration cycles (such as, for example, following a reset of system 100) as a select or enable signal to enable configuration and/or control of I/O controller 26 during such configuration cycles. As used herein, a first device (such as, for example, I/O controller 26) may be considered to be controlled or under the control of a second device (such as, for example, I/O processor 50), if the second device may supply one or more signals to the first device that may result in change and/or modification of first device's operation. Also as used herein, configuration of such a first device by such a second device may comprise the supplying by the second device of one or more signals that may be result in selection, change, and/or modification of one or more values and/or parameters stored in the first device that may result in change and/or modification of at least one operational characteristic and/or mode of the first device. In accordance with this embodiment, when card 20 is absent from slot 30, a control signal is supplied to mechanism 200 from slot 30 that results in mechanism 200 coupling IDSEL signal line 43 to bus 22 in order to allow host processor 12 to drive that line during host processor-initiated configuration cycles. However, when card 20 is properly inserted in slot 30, slot 30 supplies a control signal to mechanism 200 that results in mechanism 200 de-coupling IDSEL line 43 of controller 26 from bus 22 to "hide" controller 26 from host processor 12 during such cycles. Thereafter, by appropriately controlling this control signal, card 20 may selectively couple line 43 to, and/or selectively de-couple line 43 from bus 22, for example, during multiple scans of bus 22 initiated by I/O processor 50, in order to permit controller 26 to be located, configured and/or controlled by card 20, instead of by host processor 12. Although not shown in the Figures, with the exception of the one predetermined address line of bus 22 that is used to propagate the IDSEL signal to the I/O controller 26, in this embodiment, the signal lines of PCI bus 22 may be directly coupled to the I/O controller 26 in such a way as to permit I/O controller 26 to exchange data and/or commands, via bus 22, with other devices in system 100 that may also be coupled to bus 22.

Interrupt steering mechanism 202 may be coupled to circuit card slot 30, I/O controller 26, and interrupt controller 15 in chipset 14. Mechanism 202 may selectively couple one or more interrupt signal lines 41 from I/O controller 26 to card slot 30. Mechanism 202 also may selectively couple interrupt signal lines 41 to interrupt controller 15 in chipset 14 based upon a control signal supplied to mechanism from slot 30. This control signal may result in interrupt signal lines 41 of I/O controller 26 being coupled to interrupt controller 15 when card 20 is absent from slot 30, and may result in lines 41 being de-coupled from interrupt controller 15 when card 20 is properly inserted in slot 30. Thus, when card 20 is absent from slot 30, interrupt signals generated by I/O controller 26 may be routed or steered by mechanism 202 to interrupt controller 15 for processing by interrupt controller 15. However, when card 20 is present in slot 30, interrupt signals generated by I/O controller 26 may be routed by mechanism 202 to card 20 for processing by processor 50 in card 20. Slot 30 may transmit interrupt signals generated by card 20, when card 20 is properly inserted into slot 30, to interrupt controller 15 to permit these interrupts to be handled by interrupt controller 15.

If hardware mechanism 24 implements RAIDIOS, IDSEL control mechanism 200 may include a transistor-based switching mechanism (not shown) that may be either in a first state, in which IDSEL signal line 43 of I/O controller 26 may be coupled to PCI bus 22, or in a second state, in which that signal line 43 may be de-coupled from PCI bus 22. In one embodiment, the control signal that controls the state of this switching mechanism may be the Joint Test Action Group (JTAG) IEEE Standard Test Access Port and Boundary-Scan Architecture Test Mode Select (TMS) signal from PCI bus slot 30. This TMS signal may be compliant with IEEE Standard 1149.1-1990. That is, the TMS signal pin in PCI slot 30 may be coupled to control mechanism 200, and the state of the signal (hereinafter termed the "TMS signal" of slot 30) propagating to control mechanism 200 through this TMS signal pin of slot 30 may control the state of the switching mechanism in control mechanism 200. Slot 30 may be constructed such that, when card 20 is absent from slot 30, the state of this TMS signal may be driven to a logic state (e.g., a high logic state) that may result in the switching mechanism in control mechanism 200 connecting to bus 22 IDSEL signal line 43 of controller 26. However, when card 20 is properly inserted into slot 30, card 20 may control the logic state of this TMS signal, in the manner that will be described below.

Additionally, if hardware 24 implements RAIDIOS, interrupt steering mechanism 202 may include one or more tri-state buffers (not shown) controlled by the logic state of the signal (hereinafter termed the "TDI signal" from slot 30) propagating through the JTAG Test Data Input (TDI) pin of slot 30. These one or more tri-state buffers may permit one or more predetermined interrupt signals from controller 26 to be received by interrupt controller 15 when the signal propagating through the TDI pin of slot 30 is of a predetermined logic level (e.g., a high logic state). Slot 30 may be constructed such that, when card 20 is absent from slot 30, the signal propagating through the TDI pin of slot 30 may be driven to a high logic state, and conversely, when card 20 is properly inserted in slot 30, this signal may be driven to a low logic state and the interrupt signals from I/O controller 26 may be routed to one or more predetermined interrupt signal pins of slot 30. One or more interrupt signal pins of slot 30 may be coupled to interrupt controller 15.

As stated previously, the construction of hardware mechanism 24 may vary depending upon the particular MROMB technique that may be implemented. Thus, if hardware mechanism 24 implements a non-RAIDIOS MROMB technique, the construction and operation of IDSEL control mechanism 200, interrupt steering mechanism 202, and the control signals provided to hardware mechanism 24 from slot 30 may differ from those described for the RAIDIOS technique. Processor 50 may issue control signals that may result in card 20 providing appropriate control signals to hardware mechanism 24 to control hardware mechanism 24 so as to implement such a MROMB technique. Card 20 may include firmware program instructions stored in memory 48 that, when executed by processor 50, may result in card 20 issuing appropriate control signals to hardware 24 to permit card 20 to control and/or configure I/O controller 26.

Figure 3:
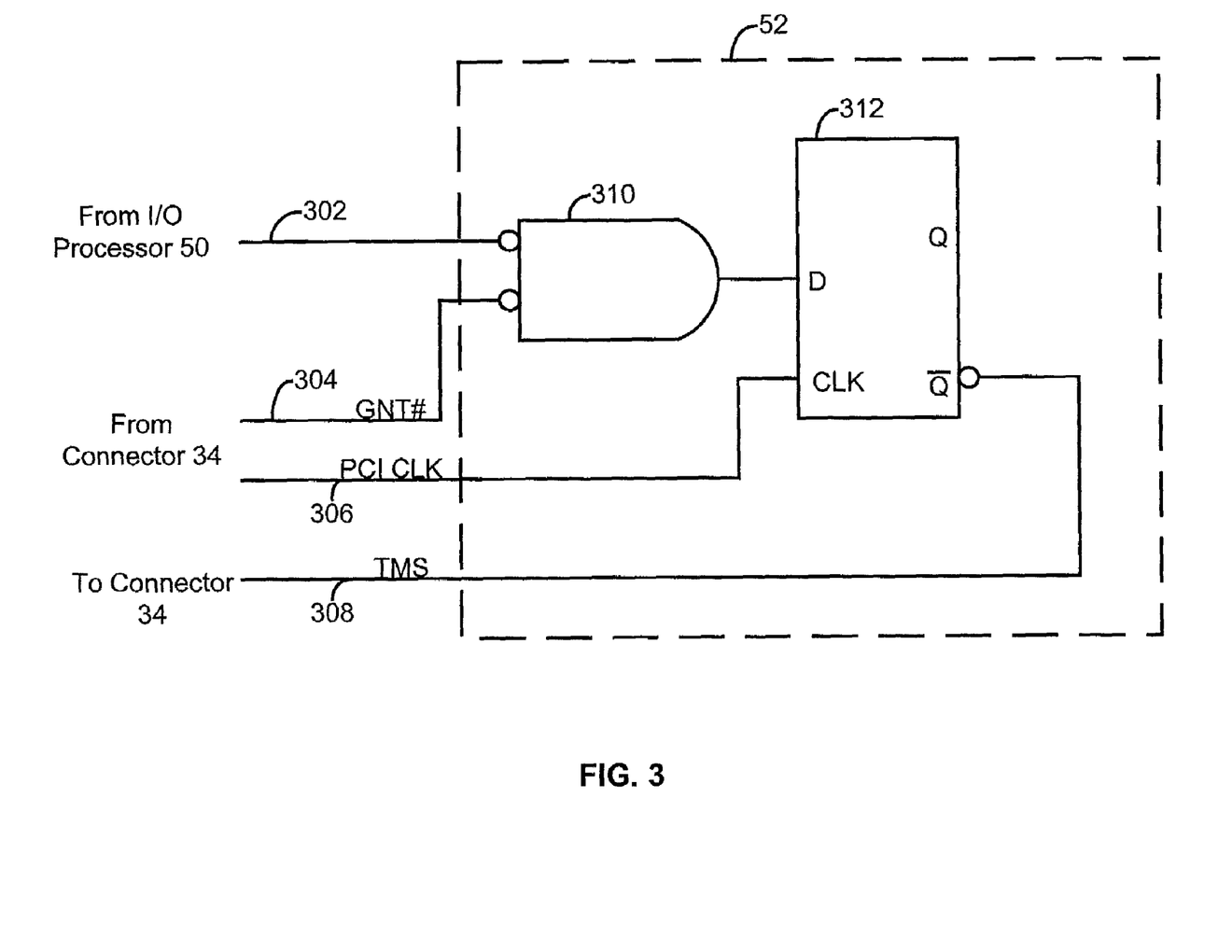
FIG. 3 is a diagram illustrating in greater detail a portion of MROMB circuit card circuitry that may be comprised in the embodiment of FIG. 1.

FIG. 3 illustrates construction of circuitry 52 in embodiment 100. Circuitry 52 may generate the control signal that may be supplied from card 20, when card 20 is inserted into slot 30, to control operation of IDSEL control mechanism 200. In this embodiment, circuitry 52 may comprise, for example, Boolean AND logic 310 and delay flip-flop logic 312. AND logic 310 may comprise two inverting inputs 302 and 304, and one output. The output of AND logic 310 may be coupled to input D of flip-flop logic 312. Flip-flop logic 312 may include an inverted output 308, and may include a clock input 306. Inputs 304 and 306, and output 308 may be coupled to connector 34. Input 302 may permit an input signal to be propagated to logic 310, via input 302, that may be, for example, a control signal generated by processor 50. The input signal that may propagate through input 304 may be, for example, a PCI bus grant signal (GNT#), controlled by a PCI bus arbiter (not shown) in system 100; prior to reaching input 304, this input signal may propagate through bus 22 to connector 34 (and thence, to card 20, when card 20 is coupled to slot 30). The input signal that may propagate through input 306 may be, for example, a PCI bus clock signal supplied to connector 34 via bus 22 (and thence, to card 20, when card 20 is coupled to slot 30). The control signal that is supplied from card 20 to control mechanism 200 may propagate via output 308 to connector 34 (and thence, to mechanism 200 via slot 30, when card 20 is coupled to slot 30).

Figure 4:
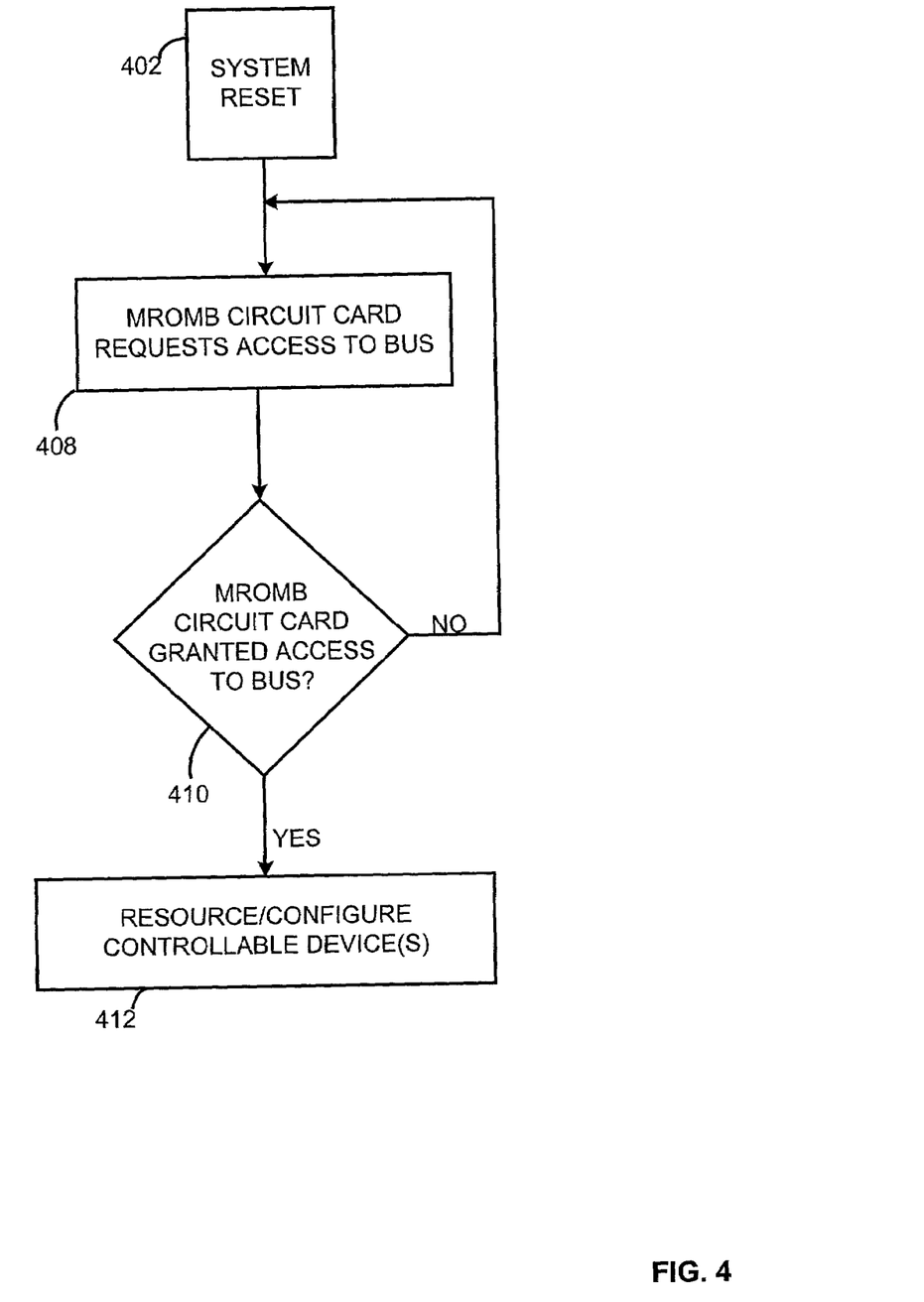
FIG. 4 is a flowchart that illustrates operations that may be involved in one embodiment.

FIG. 4 is a flowchart that illustrates operations 400 that may be carried out in system 100, in accordance with one embodiment. In system 100, after, for example, a reset of system 100, such as operation 402 in FIG. 4, host processor 12 may initiate and execute configuration cycles for devices (hereinafter termed "bus addressable devices," e.g., I/O controller 26, I/O controller 42, and card 20) that are coupled to, and are addressable and/or configurable via bus 22 in such configuration cycles. Prior to and/or during the time when host processor 12 is initiating and/or executing these configuration cycles, host processor 12 may request, and be granted by the PCI bus arbiter in system 100, access to bus 22. As used herein, a device may be considered to have been granted access to a bus, when the device has successfully arbitrated for and been granted exclusive ability to initiate one or more transactions involving the bus. In system 100, the bus arbiter may indicate to a device, such as, for example, host processor 12 or card 20, that the device has been granted access to bus 22 by asserting that device's PCI bus grant (GNT#) signal. After and/or during execution of these configuration cycles by host processor 12, the bus arbiter in system 100 may revoke its grant to host processor 12 of access to bus 22. In system 100, the bus arbiter may indicate to a device, such as, for example, host processor 12 or card 20, that the arbiter has revoked the device's previous grant of access to bus 22 by de-asserting that device's PCI bus grant (GNT#) signal.

After reset 402, I/O processor 50 may signal card 20. This may result in card 20 issuing to the bus arbiter in system 100 one or more requests that card 20 be granted access to bus 22, as illustrated in operation 408 in FIG. 4. If, at the time when card 20 issues a request that it be granted access to bus 22, host processor 12 (or another device in system 100) is currently granted access to bus 22, the bus arbiter may deny the request. Conversely, if at the time when card 200 issues such a request, no other device is currently granted access to bus 22, the bus arbiter may grant the request.

After issuance of such a request by card 20, processor 50 may determine whether card 20 has been granted access to bus 22, as illustrated by operation 410 in FIG. 4. More specifically, if the PCI bus grant signal for card 20 is not asserted within a predetermined amount of time after issuance of such a request by card 20, processor 50 may determine that card 20 has not be granted access to bus 22 as a result of the request. Processor 50 then may wait a predetermined amount of time. Thereafter, processor 50 may continue its processing with operation 408, as is illustrated in FIG. 4.

Conversely, if the bus arbiter grants to card 20 access to bus 22, the bus arbiter may assert the PCI bus grant signal for card 20 to indicate to card 20 that card 20 has been granted access to bus 22. As a result of the assertion by the bus arbiter of the PCI bus grant signal for card 20, processor 50 may determine that card 20 has been granted access to bus 22. After processor 50 has determined that card 20 has been granted access to bus 22, processor 50 may resource and/or configure one or more bus addressable devices in system 100 that may be controllable and/or configurable by card 20 using hardware mechanism 24, as illustrated by operation 412 in FIG. 4. Operations 500 that may be performed by card 20 to resource and/or configure these one or more bus addressable devices are illustrated in FIG. 5.

Figure 5:
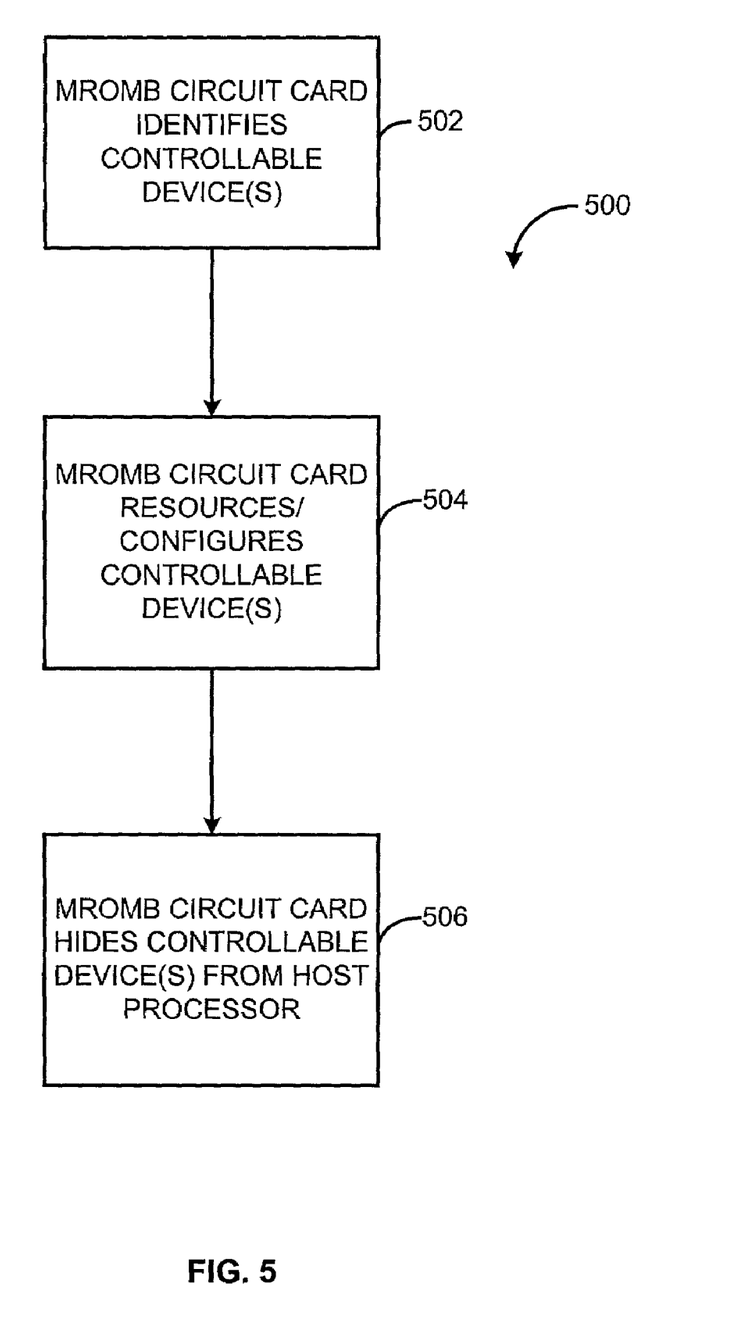
FIG. 5 is a flowchart illustrating operations that may be involved in configuring an I/O controller in accordance with one embodiment.

In response to the grant to card 20 of access to bus 22, processor 50 may signal card 20 to initiate identification of one or more bus addressable devices that may be controllable and/or configurable by card 20 using hardware mechanism 24, as is illustrated in operation 502 in FIG. 5. Processor 50 may assert the control signal that is propagated to logic 310 via input 302. Logic 310 may perform a logical AND operation using, as inputs, logical inversions of this control signal from processor 50 and the PCI bus grant signal for card 20. The output of this logical AND operation may be supplied from logic 310 to the D input of logic 312. At the next pulse of the PCI bus clock signal, logic 312 may transmit via output 308 a signal that may be the logical inverse of the output from the logic 310. As stated previously, the signal that may be output from logic 312 via output 308 may be the control signal that may be supplied from card 20 to IDSEL control mechanism 200, when card 20 is coupled to slot 30. One clock pulse after both of the signals propagating through inputs 302 and 304 have been asserted, the control signal supplied to IDSEL control mechanism 200 from card 20 may be asserted. This may result in the mechanism 200 coupling to bus 22 IDSEL signal line 43 of the one or more bus addressable devices in system 100 that may be controllable and/or configurable by card 20 using hardware mechanism 24. For example, in system 100, I/O controller 26 may be controllable and/or configurable by card 20 using hardware mechanism 24. When the control signal supplied to mechanism 200 from card 20 is asserted, this may result in mechanism 200 coupling IDSEL signal line 43 of I/O controller 26 to bus 22.

Thereafter, I/O processor 50 may determine the location or locations of any such bus addressable devices in system 100, such as, for example, the addresses along bus 22 via which any such bus addressable devices may be configured and/or controlled during one or more configuration cycles initiated by I/O processor 50, using hardware mechanism 24, as illustrated in operation 502 in FIG. 5. For example, the bus addresses of any such bus addressable devices may be predetermined, and processor 50 may be programmed with such predetermined locations.

Alternatively, processor 50 may determine the location or locations of any such controllable and/or configurable devices in system 100 based, at least in part, upon results of multiple bus scans, for example, in accordance with the teachings of Paul E. Luse and Dieter E. Massa, U.S. patent application Ser. No. Yet To Be Assigned, entitled "DEVICE DISCOVERY AND DYNAMIC CONFIGURATION OF CONTROL APPLICATION," which Application is assigned to the Assignee of the subject application, and was filed on Mar. 28, 2002. As used herein, a "bus scan" involves the issuance of one or more requests (such as, for example, configuration read requests) to one or more addresses of a bus (such as, for example, bus 22) to obtain one or more responses (such as, for example, configuration read responses) that may be, and/or contain information indicative of the existence, characteristics, type, and/or operation of one or more bus addressable devices.

For example, in system 100, I/O controller 26 may be a bus addressable device that may be controllable and/or configurable by processor 50 using hardware 24. Accordingly, as a result of operation 502, processor 50 may determine that I/O controller 26 is such a bus addressable device, and processor 50 may also determine the address along bus 22 via which I/O controller 26 may be controlled and/or configured during one or more configuration cycles initiated by I/O processor 50, using hardware mechanism 24.

After processor 50 has completed operation 502, processor 50 may resource and/or configure any bus addressable devices that it determines to be controllable and/or configurable by processor 50 using hardware 24, based upon configuration information obtained by processor 50 from such devices, as illustrated in operation 504 in FIG. 5. That is, processor 50 may allocate resources to and/or configure any such bus addressable devices. As used herein, a "resource" of a system may include a facility, instrumentality, and/or identifier for such facility and/or instrumentality in the system that may be allocated (e.g., granted) from a pool of facilities, instrumentalities, and/or identifiers, for use by and/or association with one or more devices in the system.

In this embodiment, in operation 504, processor 50 may request and obtain configuration information from I/O controller 26 that may identify the particular device type and characteristics of I/O controller 26. Based upon this information, processor 50 then may signal card 20 to supply and store in controller 26 and memory 21 control and/or configuration-related information to permit controller 26 to operate in accordance with enhanced I/O procedures. As a result of the signaling of card 20 by processor 50, card 20 may apply, via bus 22, signals to memory 21 and/or controller 26. The signals that may be applied to controller 26 by card 20 may include one or more IDSEL signals that may applied to controller 26 via line 43. The application of the signals applied to memory 21 and/or controller 26 by card 20 may result in the storing of such control and/or configuration-related information in controller 26 and/or in locations in memory 21 that may be pre-selected so as not to conflict with locations in memory 21 that might be selected by host processor 12, such as, for example, during configuration cycles initiated and/or carried out by the host processor 12, for storage of control and configuration-related information for devices configured by host processor 12. If I/O device 28 comprises an array of disk mass storage devices, these I/O procedures may permit I/O controller 26 and the array to be used as a RAID storage controller and/or RAID array, respectively. Alternatively, if I/O device 28 is used to interface system 100 to an external computer network, the I/O procedures may permit I/O controller 26 to be used as a server management controller, and/or may permit controller 26 and device 28 to utilize additional communication protocols.

After processor 50 has carried out operation 504, processor 50 may signal card 20 to apply to hardware 24 a control signal that may result in hardware 24 hiding from host processor 12 any bus addressable devices that are controllable and/or configurable by processor 50 using hardware 24, as is illustrated by operation 506 in FIG. 5. For example, in this embodiment 100, processor 50 may signal card 20 to apply to hardware 24 a control signal that may result in hardware 24 de-coupling IDSEL signal line 43 of I/O controller 26 from bus 22. More specifically, processor 50 may de-assert the control signal supplied to logic 310 via input 302. After the next pulse of the PCI clock signal supplied to logic 312 via input 306, this may result in de-assertion of the control signal supplied to IDSEL mechanism 200 via output 308. This may result in mechanism 200 de-coupling IDSEL signal line 43 of I/O controller 26 from bus 22.

After card 20 has performed operation 506, the bus arbiter in system 100 may revoke its grant to card 20 of access to bus 22. The bus arbiter may indicate this to card 20 by de-asserting the PCI bus grant signal for card 20.

System 100 has been described as comprising a single bus addressable device, such as, controller 26, that may be controlled and/or configured by card 20 using hardware 24. However, system 100 may include a plurality of bus addressable devices that may be controllable and/or configurable by card 20 using hardware 24.

Additionally, the respective configuration operations that may be performed by host processor 12 and I/O processor 50 have been previously described as taking place sequentially, with the configuration operations that may be performed by host processor 12 occurring prior to the configuration operations that may be performed by I/O processor 50. However, depending upon when processor 12 and card 20 are granted access to bus 22, the configuration operations that may be performed by card 20 may precede the configuration operations that may be performed by host processor 12, without departing from this embodiment.

In summary, in one embodiment of the claimed subject matter, a circuit card is provided that includes a connector that may be used to couple the card to a bus in a motherboard. The motherboard also may include a host processor, MROMB motherboard hardware, and at least one bus addressable device coupled to the bus. When the card is coupled to the bus, circuitry in the card may also be coupled to the bus, and may control and/or configure the at least one bus addressable device using the MROMB motherboard hardware. The circuitry may include an I/O processor and associated firmware memory. When the circuitry in the card is coupled to the bus, the circuitry may be capable of providing, in response, at least in part, to an indication that the card has been granted access to the bus, a control signal that may result in coupling of the IDSEL line of the at least one device to the bus, and thereafter, the card may configure the at least one bus addressable device. Thereafter, the card may cease providing that control signal, and as a result, the at least one device's IDSEL line may be de-coupled from the bus. Advantageously, in this embodiment, since the coupling to the bus of the IDSEL line and the configuration of the at least one device may take place after the grant to the card of access to the bus, and thereafter, the IDSEL line may be de-coupled from the bus, this may reduce the possibility that both the host processor and the card may attempt to configure and/or control the at least one device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   receiving an indication that a first device has been granted access to a bus;
   in response, at least in part, to the indication, asserting a control signal that results in coupling of signal line of a second device to the bus; and
   after providing the control signal, configuring by the first device of the second device;
   the first device comprising first logic to generate an output based upon the indication and another signal from a processor, and second logic to generate the control signal based upon the output and a clock signal propagated from the bus.

2. The method of claim 1, wherein:
   the indication is received at the first device; and
   the control signal is provided from the first device.

3. The method of claim 1, wherein:
   the control signal is provided to a third device; and
   in response, at least in part, to the providing of the control signal to the third device, the third device couples the signal line to the bus.

4. The method of claim 1, further comprising:
   controlling by the first device of the second device.

5. The method of claim 1, further comprising:
   propagating an Initialization Device Select (IDSEL) signal to the second device via the signal line.

6. An apparatus comprising:
   a first device to receive an indication that the first device has been granted access to a bus, to provide, in response, at least in part, to the indication, a control signal that results in coupling of a signal line of a second device to the bus, and to configure, after providing the signal, the second device, the first device comprising first logic to generate an output based upon the indication and another signal from a processor, the first device also comprising second logic to generate the control signal based upon the output and a clock signal propagated from the bus.

7. The apparatus of claim 6, wherein:
   the first device is also capable of controlling the second device.

8. The apparatus of claim 6, wherein:
   the first device is also capable of propagating an Initialization Device Select (IIDSEL) signal to the second device via the signal line.

9. The apparatus of claim 6, wherein:
   the first device is also capable of being coupled to the bus.

10. An article comprising:
    a storage medium storing instructions that when executed by a machine result in the following:
    receiving of an indication that a first device has been granted access to a bus;
    providing, in response, at least in part, to the indication, of a control signal that results in coupling of a signal line of a second device to the bus; and
    configuring by the first device, after the providing of the control signal, the second device;
    the first device comprising first logic to generate an output based upon the indication and another signal from a processor, and second logic to generate the control signal based upon the output and a clock signal propagated from the bus.

11. The article of claim 10, wherein:
    the indication is received at the first device; and
    the control signal is provided from the first device.

12. The article of claim 10, wherein:
    the control signal is provided to a third device; and
    in response, at least in part, to the providing of the control signal to the third device, the third device couples the signal line to the bus.

13. The article of claim 10, wherein:
    the instructions, when executed by the machine, also result in controlling by the first device of the second device.

14. The article of claim 10, wherein:
    the instructions, when executed by the machine, also result in propagation of an IDSEL signal to the second device via the signal line.

15. A system comprising:
    a circuit board including a processor, a bus, and at least one device; and
    circuitry capable of being coupled to the bus, and when the circuitry is coupled to the bus, the circuitry is also capable of providing, in response, at least in part, to an indication that the circuitry has been granted access to the bus, a control signal that results in coupling of a signal line of the at least one device to the bus, and of configuring, after providing the signal, the at least one device, the circuitry comprising first logic to generate an output based upon the indication and another signal from an input/output (I/O) processor, the circuitry also comprising second logic to generate the control signal based upon the output and a clock signal propagated from the bus.

16. The system of claim 15, wherein:
    the processor comprises a host processor;

the at least one device comprise at least one of a data storage controller, a network data communication controller, and a server management controller; and
the circuitry comprises the input/output (I/O) processor.

17. The system of claim 15, wherein:
the circuit board also includes a modular redundant array of inexpensive disks (RAID) on motherboard (MROMB) mechanism.

18. The system of claim 15, further comprising:
a circuit card that comprises the circuitry, the circuit card being capable of being coupled to the bus.

19. The system of claim 15, wherein:
the circuit board also includes an interrupt controller and a mechanism to control application of one or more interrupt signals from the at least one device to the interrupt controller.

20. The system of claim 15, wherein:
the circuit board also includes a mechanism to control receipt by the at least one device of one or more enable signals from the bus.

21. The system of claim 15, wherein:
at least one device is capable of receiving an Initialization Device Select (IDSEL) signal; and
the circuitry is capable of controlling whether the at least one device receives the IDSEL signal.

22. The system of claim 15, wherein:
the circuit board comprises a circuit card slot; and
the system further comprises a circuit card that comprises the circuitry, the circuit card being capable of being coupled to the bus via the slot.

* * * * *